3,329,673
PREPARATION OF HIGH VISCOSITY STARCH PHOSPHATES
Dahlia S. Greidinger and Brilliantina M. Cohen, Haifa, Israel, assignors to Chemicals & Phosphates Ltd., Haifa, Israel, a corporation of Israel
No Drawing. Filed June 19, 1963, Ser. No. 288,910
12 Claims. (Cl. 260—233.5)

This invention relates to the production of cold-water-dispersible, high viscosity reaction products of starch and alkali metal salts of orthophosphoric acid.

It is an object of this invention to provide improved processes for the production of the aforementioned reaction products.

It is a further object of this invention to provide processes for the production of improved cold-water-dispersible, high viscosity reaction products of starch and alkali metal salts of orthophosphoric acid.

The principal object of this invention is the production of the aforementioned high viscosity reaction products directly, without incurring the necessity of resorting to treatment with solvents, fractionation, concentration, isolation or purification processes.

The foregoing and other objects of this invention will become apparent from the description and claims which follow herein.

For convenience, reaction products of starches and alkali metal salts of orthophosphoric acid, be they of the prior art or of the present invention, are designated in the present description and claims as "starch phosphates" even though there is reason to suppose that in the reaction between starches and alkali metal salts of orthophosphoric acid, the formation of starch phosphate esters is by no means the only change which the starches undergo. In any event, in starch phosphates, invariably, the content of total phosphorus (as phosphate), is divided between organically bound phosphate and inorganic phosphate.

The term "viscosity," as employed in the present description and claims, connotes the viscosity of a dispersion of 5 parts by weight of starch posphate homogeneously dispersed at room temperature (about 22° C.), in 95 parts by weight of distilled water, measured at room temperature with a Brookfield Synchro-Lectric viscometer employing spindle No. 4 at 6 r.p.m.

Throughout the present description and claims: (1) viscosity is expressed in centipoises (2) temperatures are expressed in degrees centigrade (3) capital P designates the element phosphorus (4) the term "phosphate" stands for "orthophosphate" and is used interchangeably therewith (5) the term "ratio" designates the relationship between the organically bound P and the inorganic P in the anhydrous starch phosphate; this figure is obtained by dividing the percentage of organically bound P by the percentage of inorganic P; "parts" are parts by weight and "percentages" are percent by weight.

The starch phosphates of the present invention swell in cold water and disperse readily therein to form colloidal solutions. The terms "dispersed" and "dissolved" also "dispersion" and "solution" are employed interchangeably in the present description and claims.

The starch phosphates of the present invention serve superlatively in many end uses, e.g., in stabilizing suspensions and emulsions, in paper and textile processing, in differential mineral froth flotation, in foundry core binders, in oil field drilling muds, in pharmaceuticals and in food products such as, sauces, salad dressings, pie fillings, confections, ice creams, puddings, gravies, soups, etc. In most cases viscosity of the aqueous dispersions in a highly desired property and especially is this the case where the starch phosphate is employed as a thickening agent. For such purposes the viscosity is required to be not less than 20,000; for many applications, starch phosphates with viscosities or at least 40,000 are especially useful.

It is well known that the prior art starch phosphates, as prepared, i.e. prior to concentration by solvent treatment, for instance, by the procedures shown in U.S. Patents Nos. 2,884,412 and 2,961,440, have viscosities of the order of about 1000 to about 5,000 and leave much to be desired in terms of viscosity, particularly, where thickening is the functional end use. To remedy this grave defect laborious, time-consuming, cost-incurring fractionation procedures have laterally been resorted to (see for example U.S. Patent 2,993,041 or British Patent 857,868). These procedures are expensive by reason of the fact that they involve: (1) use and eventual recovery of hugh volumes of organic solvents (2) substantial investment in additional equipment (3) additional processing and (4) loss in weight, that is to say, the resultant relatively higher viscosity starch phosphate is only a portion of the starch phosphate starting material. Indeed, the relatively higher viscosity is achieved by removing from the starch phosphate starting material, lower viscosity constituents, inorganic phosphate salts, etc. This results in substantial shrinkage in the weight of the finished product and a correspondingly considerable increase in cost. All of these disadvantages are multiplied and the cost factors aggravated by the fact that the fractionation has to be repeated successively, on successive fractions from a given starting starch-phosphate-material if purified products with viscosities of 20,000 or more are desired. In short such processes for upgrading low viscosity starch phosphates are so excessively, indeed, prohibitively troublesome and costly as to be impractical.

The present invention overcomes all of the foregoing problems and produces starch phosphates with viscosities of at least 20,000 virtually in one step (subsequently to the preparation of a dry, inorganic phosphate-salt-containing starch), namely, simply by heating. Fractionation, concentration, solvent treatment or purification are unnecessary. Costs are at a minimum and novel starch phosphates with viscosities as high as 40,000 to 50,000 are producible at will, directly, simply and cheaply, the finished, high viscosity starch phosphate being in hand as prepared.

We have made the unexpected and surprising discovery that starch phosphates with viscosities of at least 20,000 result from the aforementioned simple, direct heat treatment when the following correlated conditions in combination are satisfied: (1) the starch is reacted with alkali metal phosphate in the proportion of between 0.10 gram mol and 0.25 gram mol, especially 0.10 gram mol, and better still 0.13 gram mol to 0.19 gram mol of alkali metal phosphate salt to 160 grams of anhydrous starch, (2) the pH of the alkali metal phosphate material, measured at 25° C. at the concentrations employed, is between about 6 and about 6.7, especially 6.3 to 6.6 and (3) the time and temperature range of the reaction are so correlated with one another as to produce a starch phosphate in which the inorganic P is less than 1%; the ratio of organically bound phosphorus to inorganic phosphorus is at least 3; the content of total phosphorus is between 1.7% and 3.8%, especially 2.2% to 3.2% of the anhydrous, finished starch phosphate and all of the phosphorus being derived from the alkali metal phosphate salt material incorporated in the starch for reaction therewith. Especially suitable conditions for the heating step of our process are between about 6 hours at about 150°–160° and about 5 minutes at about 200°, especially about 15 minutes at about 180°. Heating is best done under conditions favorable to the removal of moisture which is liberated; either in vacuum or under more or less ventilation.

For the purpose of the present invention it is inconsequential by what route the desired molal ratio of alkali metal phosphate to starch in the unreacted salt-starch composition is attained just so the alkali metal phosphate material is substantially homogeneously distributed within the starch. This can be achieved in any one of a number of ways as, for example, by slurrying the starch in an excess of aqueous alkali metal phosphate salt solution of about pH 6 to 6.7, especially 6.3 to 6.6, containing about 0.8 to about 1.5 gram mols, especially 0.8 to 1.3 gram mols of alkali metal phosphate salt per kilogram of solution, stirring about 10 minutes at about 15° to about 35° C., and subjecting the slurry to separation, usually so-called suction or vacuum filtration or centrifuging, to produce a cake. The concentrations of these solutions are based on the experimental observations that, when such slurries are filtered, 180° g. of commercial starch (containing about 10% moisture) retain about 140 to 145 g. of solution. The amount of phosphate salt material to be incorporated should therefore be present in that weight of solution. If a different separation procedure or equipment is found to give a different ratio of solution to starch, the concentration of the solution should be accordingly adjusted.

Time and temperature of slurrying are not sharply critical, just so the starch remains ungelatinized. While we prefer to slurry for about 10 to about 30 minutes, the time can be lengthened if desired and while our preferred temperature for slurrying is about 15° to 35°, lower or higher temperatures, such as 40° to 50°, may be employed.

Depending upon: (1) the method of separating the starch from excess of phosphate salt solution (2) the concentration of the aqueous alkali metal phosphate salt solution and (3) the amount of alkali metal phosphate salt desired to be incorporated into the starch, the ratio by weight of phosphate salt solution to starch varies over a wide range: from less than the weight of the starch to several times the weight of the starch; to wit, in Example 7, the weight of solution is somewhat less than the weight of the starch, in Example 2 they are approximately equal, while in Example 3 the weight of solution is 2.5 times as great as the weight of starch; the starch in all the cited examples containing initially about 10% moisture. In general, to effect the incorporation of any specific, desired amount of alkali metal phosphate salt material into the starch, this ratio should be adjusted inversely up or down as a function of the concentration of the alkali metal phosphate salt solution, other factors being constant.

Vacuum or so-called suction filtration usually gives filter cake in which about 140 to 145 parts by weight of solution are retained by 180 parts by weight of commercial corn starch (containing about 10% moisture).

If another method of separating the starch from the excess of alkali metal phosphate solution is employed, say, centrifuging, and the retention of alkali metal phosphate solution in the separated starch is less or greater than the retention in vacuum filtration the concentration of the alkali metal phosphate solution is adjusted downward or upward respectively, in order to arrive at the desired molal ratio of alkali metal phosphate salt material to starch.

Another procedure for preparing the composition of moist starch with inorganic alkali metal phosphate salt material homogeneously distributed therein is to spray a desired amount of water into a previously prepared homogeneous, dry mixture of dry starch and finely comminuted alkali metal phosphate salt, maintaining said starch-salt mixture under vigorous agitation while the water is being sprayed in.

A very economical, convenient, overall low cost method consists in dissolving the solid or crystalline alkali metal phosphate salt material in a starch slurry in the original starch manufacturing process at the original starch manufacturing site. Thereby the normal cost of isolating, drying and packaging the starch is completely eliminated.

Yet another way of preparing the composition of moist starch with inorganic alkali metal phosphate salt material homogeneously distributed therein is to spray about 140 parts of the above described phosphate solutions, or a slightly higher or lower quantity of solution containing the required quantity of phosphate salt material, into 180 parts of commercial starch (with about 10% moisture content) while maintaining the starch under vigorous agitation. In this procedure the necessity of filtering, centrifuging, or otherwise separating the salt-starch composition is dispensed with.

The phosphate-salt-containing, moist starch or starch cake obtained by any of the above or alternative procedures is dried at first, to avoid gelatinization, at temperatures not above about 70° C. depending upon the particular starch and then at higher temperatures up to about 110° C. or even somewhat higher to dryness. Reacting this dry, intermediate composition by heating at about 150–160° for about 6 hours or for a much shorter time at about 180° to 200°, especially for 15 minutes at 180° gives the high viscosity starch phosphates of the present invention. The heating can be carried out in vacuum or at atmospheric pressure in an atmosphere of air or inert gas, with more or less ventilation.

While the drying of the moist starch-salt composition or filter cake down to a moisture content of around 2% is especially desirable, satisfactory results can also be obtained by reducing the moisture content to anywhere below 15%.

The illustrative examples, specific embodiments of our invention, which follow, are to be regarded as typical and informative but not as limiting the invention in any sense. All references to parts and percentages are by weight.

*Example 1*

114.0 g. orthophosphoric acid of 85% strength (equivalent to 97 g. 100% orthophosphoric acid), diluted by the addition of 125 ml. water, were neutralized by 63.0 g. sodium hydroxide of 97% strength (equivalent to 61 g. 100% sodium hydroxide), dissolved in 250 ml. water. The solution was again diluted to a final weight of 700 g. The pH was 6.5.

51.6 g. of the above stock solution were diluted with 45 g. of water and 90 g. of corn starch were added. After stirring for 30 minutes at 30°, the slurry was dried overnight in an oven at 70°. The temperature was raised to 150° over 1 hour and heated at 150–155° for 7 hours, the last two hours in an air stream. The resultant starch phosphate showed the following properties: Total P, 2.2%; Inorganic P, 0.35%; Bound P, 1.85%; ratio 5.3. The product was light tan, had a bland flavor and dispersed in cold water with a viscosity of 40,000.

*Example 2*

62.3 g. of the stock solution described in Example 1 were diluted with 25 g. of water and 90 g. corn starch were added. The slurry was worked up as in Example 1. The starch phosphate thus produced had the following characteristics:

Total P, 3.2%; Inorganic P, 0.5%; Bound P, 2.7%; ratio 5.4; viscosity, 34,000.

The product was similar to the one described under Example 1.

*Example 3*

19.5 g. of monosodium phosphate dihydrate and 49 g. of disodium phosphate heptahydrate were dissolved in 160 g. of water. The solution had a pH of 6.5. 90 g. of corn starch were added and the slurry was stirred for about 10 minutes at 30° and filtered. The broken-up filter cake was dried overnight at 60°. It was then placed in an open reaction vessel and heated under vigorous stirring to 130°. It was then kept at this temperature for 1 hour before raising the temperature to about 160°. After 4 hours at 160–170° the product was ready. It possessed the following properties: Total P, 2.9%; Inorganic P, 0.4%; Bound P, 2.5%; ratio 6.3 and the cold water dispersion had a viscosity of 43,500.

*Example 4*

12.2 g. $H_3PO_4$ (85%) were neutralized with a solution of sodium hydroxide to a pH of 6, the final weight of the solution being 90 g. 100 g. corn starch were added and stirred for 30 minutes at 30°. The broken up salt-starch composition was dried overnight at 70°. The temperature was raised to 150° in 30 minutes and the product was heated at 150–155° under a partial vacuum and in a stream of air for 7 hours and then cooled to room temperature. The starch phosphate produced dispersed readily in cold water and showed:

Total P, 3.07%; Inorganic P, 0.64%; Bound P, 2.43%; ratio 3.8 and viscosity, 35,000.

*Example 5*

14.3 g. $H_3PO_4$ (85%) dissolved in 13 g. $H_2O$ were neutralized with 8.0 g. sodium hydroxide dissolved in 31 g. $H_2O$. The weight of the solution was increased to 110 g. by dilution with water. 115 g. potato starch were added and the slurry stirred for 30 minutes at 30°. It was dried overnight at 70°, then heated up to 160–165° in a period of 2 hours and kept at 160–165° for 6 hours. The properties of the resultant starch phosphate were as follows:

Total P, 3.3%; Inorganic P, 0.7%; Bound P, 2.6%; ratio 3.7. Viscosity, 26,000.

The product had a light color, dispersed well in cold water and gave stable viscous solutions.

*Example 6*

50 g. of corn starch were mixed for 30 minutes, at room temperature, with 18 g. of water and 25 g. of a stock solution of sodium phosphate of pH 6.5 containing 3.5% P. The slurry so obtained was dried and subsequently heated as in Example 1. The resultant starch phosphate showed the following:

Total P, 1.85%; Inorganic P, 0.35%; Bound P, 1.5%; viscosity, 30,000; ratio 4.3.

*Example 7*

Yet another useful embodiment of our invention is illustrated in the following example: To 114.0 g. of orthophosphoric acid (85%, equivalent to 97 g. of 100% orthophosphoric acid) diluted by the addition of 125 ml. of water, were added 63.0 g. of sodium hydroxide (97%, equivalent to 61 g. of 100% sodium hydroxide) dissolved in 250 ml. of water. This phosphate solution was finally diluted with 250 ml. of water and 848 g. of corn starch were added. After mixing for 30 minutes at 30°, the phosphate-starch composition was air-dried for several hours. The air-dried composition was then dried for 1 hour at 110°. Thereupon the temperature was raised to 180° in a period of 30 minutes and the temperature maintained at 180° for 15 minutes. At this point heating was stopped and the product was rapidly cooled to room temperature. The starch phosphate so produced was readily dispersible in cold water, contained 3.6% total P and had a viscosity of 20,000.

*Example 8*

90 g. commercial cornstarch were intimately mixed with 80 g. of a solution of sodium phosphate of pH 6.5 containing 0.047 M phosphate (1.46 g. P). After drying at 70°, the temperature was raised to 150° over 1.5 hours and the product was kept at 150–160° over 8 hours. The product dispersed in water.

*Analysis.*—Total P, 1.7%; Inorganic P, 0.3%; Bound P, 1.4%; viscosity, 20,000; ratio 4.6.

*Example 9*

90 g. commercial cornstarch were slurried in 160 g. of a solution of sodium phosphate of pH 6.5 containing 0.25 M phosphate (7.75 g. P). After filtration the cake weighed about 160 g. It was worked up as under Example 8. The product was light tan. It was readily dispersible in water to give a transparent solution.

*Analysis.*—Total P—3.8%; Inorganic P—0.9%; Bound P—2.9%; viscosity, 20,000; ratio 3.2.

*Example 10*

A solution of sodium phosphate of pH 6.5 was prepared by neutralizing 200 g. of phosphoric acid (85%) with a solution of 110 g. sodium hydroxide pellets. The final weight of the solution was 1200 g. The pH was 6.5. 350 g. commercial cornstarch were intimately mixed with 210 g. of the above solution and some water. After drying overnight at 70°, the cake was broken up and placed in a revolving drum. The temperature was raised to 170° over about 2½ hours and kept at 170–175° for 75 minutes.

*Analysis.*—Total P, 2.5%; Inorganic P, 0.3%; Bound P, 2.2%; viscosity, 43,000; ratio, 7.3.

*Example 11*

Illustrative of one typical use of our starch phosphates is the following: 5.4 g. of the product of Example 2 were intimately mixed with 14.6 g. sugar, a few drops of a commercial vanillin extract and some egg-yolk color. The mix was added to 100 ml. cold milk and either shaken in a cocktail shaker or beaten with a fork for about 40 seconds. It was then poured into serving dishes. After 10 minutes without refrigeration the mixture set into a smooth, creamy pudding. The dishes could be turned over without even moving their contents. Both taste and texture were excellent.

Descriptions of additional illustrative starch phosphates produced by the processes of our invention, namely, Examples 12 to 15 are tabulated hereinbelow, the viscosities of each of said starch phosphates being at least 20,000.

| Example | Total P in the finished anhydrous starch phosphate, percent | Total P content expressed as gram mols of alkali metal phosphate per 160 grams of anhydrous corn starch | Percentages of P in the finished anhydrous starch phosphate | | Ratio of organic P to inorganic P | Duration and Temperature of heating step |
|---|---|---|---|---|---|---|
| | | | P in the form of inorganic phosphate | P in the form of organically bound phosphate | | |
| 12 | 2.28 | 0.14 | 0.34 | 1.94 | 5.7 | 6 hours at 150–160°. |
| 13 | 3.08 | 0.18 | 0.22 | 2.86 | 13.6 | Do. |
| 14 | 3.40 | 0.21 | 0.43 | 2.97 | 6.9 | 15 minutes at 180°. |
| 15 | 3.74 | 0.23 | 0.72 | 3.02 | 4.2 | 6 hours at 150–160°. |
| A | 4.25 | 0.27 | 1.25 | 3.0 | 2.4 | 15 minutes at 180°. |
| B | 5.1 | 0.34 | 2.6 | 2.4 | 0.9 | 6 hours at 150–160°. |
| C | 6.6 | 0.48 | 3.6 | 3.0 | 0.8 | Do. |
| D | 7.1 | 0.53 | 4.3 | 2.8 | 0.7 | 15 minutes at 180°. |

In all of the tabulated examples, the phosphate salt material had a pH of 6.5. Moreover, appended to the table are four examples, namely, Examples A, B, C and D, which are outside the scope of our invention, for reasons set forth above.

The starch phosphates of Examples A, B, C and D were low viscosity products similar to the prior art low viscosity starch phosphates referred to in the earlier part of the present description as being employed in upgrading procedures—involving treatment with solvents, concentration, fractionation and purification—for the purpose of arriving at starch phosphates having viscosities comparable with the high viscosities of the "as prepared" starch products of the present invention.

Under the correlated conditions of the processes of the present invention, when the total P is in the range of 1.7% to 3.8%, starch phosphates are produced in which the inorganic P is below 1%, the ratio is at least 3 and the viscosities are at least 20,000, the total P being wholly derived from the alkali metal phosphate salt material incorporated in the starch for the purpose of being brought into reaction therewith. On both sides of the aforementioned range of total P, both below and above it, the viscosities of the starch phosphates are reduced. Furthermore, at total P below 1.7%, cold water dispersibility of the starch phosphates suffers. With total P contents above 4%, and generally above 3.8 or 3.9%, depending upon the character of the starch used, inorganic P rises appreciably above 1%, the ratio falls below 3, and low viscosity starch phosphates result, as reflected by Examples A, B, C and D.

Especially preferred starch phosphates are those with viscosities of at least 30,000 and, here, such result generally where the total P is in the range of 1.8% to 3.2%, particularly 2.2% to 3.2%, and where the ratio is in the range of 3.7 to 7.3.

The foregoing examples demonstrate the wholly unpredictable and dramatic increases in the viscosity of the "as prepared" starch phosphates of the present invention, namely, when the criteria disclosed above are observed, including starch phosphates where peak ratios are at least 5 or even materially higher and which are reflected by exceptionally high viscosities.

Throughout the present description and claims the term "starch" is employed to designate tuber and grain starches, including but not limited to, potato starch, cassava starch, arrowroot starch, wheat starch, corn starch, sorghum or waxy maize starch and combinations and mixtures thereof, as well as modifications thereof insofar as they retain the essential characteristics of the original ungelatinized starches.

It will be understood, of course, that the different starches, depending upon their source and the processes by which they are produced, will vary somewhat in their response to the method of the present invention but, in all cases so far as we are aware, starch phosphates can be produced with viscosities of at least 20,000. Particularly satisfactory for use in the practice of our present invention are commercial corn starches.

Throughout the present description and claims the term "alkali metal" denotes sodium, potassium or lithium as well as combinations thereof; the term "phosphate salt material" denotes the aggregate total of inorganic phosphate salt substance which is employed to react with starch; the term "separating" denotes the removal of starch from an aqueous liquid in which it is suspended, be it by filtering, centrifuging or by any alternative method. To illustrate, in Example 3 the combination of "19.5 g. of monosodium phosphate dihydrate and 49 g. of disodium phosphate heptahydrate" is the "phosphate salt material." In Example 5 the phosphoric acid reacted with sodium hydroxide constitutes the "phosphate salt material."

Phosphate salt material of desired pH, in the range of 6 to 6.7, may be prepared in a number of ways, including interaction of: (1) monosodium dihydrogen phosphate with disodium phosphate (2) trisodium phosphate with phosphoric acid (3) disodium phosphate with phosphoric acid (4) monosodium dihydrogen phosphate with trisodium phosphate (5) phosphoric acid with sodium hydroxide.

What we claim as new and desire to protect by Letters Patent of the United States is:

1. A process for the production of cold-water-dispersible starch phosphates with viscosities of from 20,000 to 50,000 centipoises which comprises homogeneously incorporating in an ungelatinized starch an alkali metal phosphate salt material of pH of about 6 to about 6.7 in proportions ranging between 0.10 gram mol and 0.23 gram mol of said phosphate salt material per 160 grams of anhydrous starch and heating said starch-salt composition, in the absence of moisture sufficient to gelatinize said starch, at temperatures sufficiently high and for periods of time sufficiently long to produce starch phosphates wherein the ratio of organically bound phosphorus to inorganic phosphorus is at least 3, the inorganic P is less than 1% and the content of total phosphorus is between 1.7% and 3.8%, the total phosphorus being derived solely from the aforesaid alkali metal phosphate salt material.

2. A process for the production of cold-water-dispersible starch phosphates with viscosities of from 30,000 to 50,000 centipoises which comprises homogeneously incorporating in an ungelatinized starch an alkali metal phosphate salt material of pH of about 6 to about 6.7 in proportions ranging between 0.10 gram mol and 0.19 gram mol of said phosphate salt material per 160 grams of anhydrous starch, drying said starch-salt composition at temperatures below the gelatinization point of said starch to constant weight, drying further at higher temperatures up to about 110 degrees to constant weight and heating the dried composition at temperatures sufficiently high and for periods of time sufficiently long to produce starch phosphates wherein the ratio of organically bound phosphorus to inorganic phosphorus is at least 3, the inorganic P is less than 1% and the content of total phosphorus is between 1.8% and 3.2%, the total phosphorus being derived solely from the aforesaid alkali metal phosphate salt material.

3. A process for the production of cold-water-dispersible starch phosphates with viscosities of from 30,000 to 50,000 centipoises which comprises homogeneously incorporating in an ungelatinized starch an alkali metal phosphate salt material of pH of about 6 to about 6.7 in proportions ranging between 0.13 gram mol and 0.19 gram mol of said phosphate salt material per 160 grams of anhydrous starch and heating said starch-salt composition, in the absence of moisture sufficient to gelatinize said starch, at temperatures sufficiently high and for periods of time sufficiently long to produce starch phosphates wherein the ratio of organically bound phosphorus to inorganic phosphorus is at least 3, the inorganic P is less than 1% and the content of total phosphorus is between 2.2% and 3.2%, the total phosphorus being derived solely from the aforesaid alkali metal phosphate salt material.

4. A process for the production of cold-water-dispersible starch phosphates with viscosities of from 20,000 to 50,000 centipoises which comprises homogeneously incorporating in an ungelatinized corn starch an alkali metal phosphate salt material of pH of about 6 to about 6.7 in proportions ranging between 0.10 gram mol and 0.23 gram mol of said phosphate salt material per 160 grams of anhydrous starch and heating said starch-salt composition, in the absence of moisture sufficient to gelatinize said starch, at temperatures sufficiently high and for periods of time sufficiently long to produce starch phosphates wherein the ratio of organically bound phosphorus to inorganic phosphorus is at least 3, the inorganic P is less than 1% and the content of total phosphorus is between 1.7% and 3.8%, the total phosphorus being derived solely from the aforesaid alkali metal phosphate salt material.

5. A process for the production of cold-water-dispersible starch phosphates with viscosities of from 20,000 to 50,000 centipoises which comprises homogeneously mixing with an ungelatinized starch an aqueous solution of an alkali metal phosphate salt material of pH of about 6 to about 6.7, the quantity of salt solution being in excess of the amount absorbed by the starch and the concentration of the salt solution being such that, after separation of the excess of salt solution, the moist starch-salt composition contains between 0.10 gram mol and 0.23 gram mol of said phosphate salt material per 160 grams of anhydrous starch, separating the starch-salt composition from excess salt solution, drying the separated starch-salt composition to a moisture content below 15% under conditions that permit the starch to remain ungelatinized, and heating the dried composition at temperatures sufficiently high and for periods of time sufficiently long to produce starch phosphates wherein the ratio of organically bound phosphorus to inorganic phosphorus is at least 3, the inorganic P is less than 1% and the content of total phosphorus is between 1.7% and 3.8%, the total phosphorus being derived solely from the aforesaid alkali metal phosphate salt material.

6. A process for the production of cold-water-dispersible starch phosphates with viscosities of from 20,000 to 50,000 centipoises which comprises homogeneously mixing with an ungelatinized starch an aqueous solution of an alkali metal phosphate salt material of pH of about 6 to about 6.7, the quantity of salt solution being in excess of the amount absorbed by the starch and the concentration of the salt solution being such that, after separation of the excess of salt solution, the moist starch-salt composition contains between 0.10 gram mol and 0.23 gram mol of said phosphate salt material per 160 grams of anhydrous starch, separating the starch-salt composition from excess salt solution, drying the separated starch-salt composition to a moisture content below 15% under conditions that permit the starch to remain ungelatinized, and heating the dried composition in the range of about 15 minutes to about 180 degrees and about 6 hours at between about 150 degrees to about 160 degrees to produce starch phosphates wherein the ratio of organically bound phosphorus to inorganic phosphorus is at least 3, the inorganic P is less than 1% and the content of total phosphorus is between 1.7% and 3.8%, the total phosphorus being derived solely from the aforesaid alkali metal phosphate salt material.

7. A process for the production of cold-water-dispersible starch phosphates with viscosities of from 30,000 to 50,000 centipoises which comprises homogeneously mixing with an ungelatinized starch an aqueous solution of an alkali metal phosphate salt material of pH of about 6 to about 6.7, the quantity of salt solution being in excess of the amount absorbed by the starch and the concentration of the salt solution being such that, after separation of the excess of salt solution, the moist starch-salt composition contains between 0.13 gram mol and 0.19 gram mol of said phosphate salt material per 160 grams of anhydrous starch, separating the starch-salt composition from excess salt solution, drying the separated starch-salt composition to a moisture content below 15% under conditions that permit the starch to remain ungelatinized, and heating the dried composition in the range of about 15 minutes at about 180 degrees and about 6 hours at between about 150 degrees to about 160 degrees to produce starch phosphates wherein the ratio of organically bound phosphorus to inorganic phosphorus is at least 3, the inorganic P is less than 1% and the content of total phosphorus is between 2.2% and 3.2%, the total phosphorus being derived solely from the aforesaid alkali metal phosphate salt material.

8. A process for the production of cold-water-dispersible starch phosphates with viscosities of from 20,000 to 50,000 centipoises which comprises homogeneously incorporating in an ungelatinized corn starch an alkali metal phosphate salt material of pH of about 6 to about 6.7 the concentration of the solution being in the range of about 0.8 and about 1.5 gram mols of said phosphate salt material per kilogram of said solution in proportions ranging between 0.10 gram mol and 0.23 gram mol of said phosphate salt material per 160 grams of anhydrous starch and heating said starch-salt composition, in the absence of moisture sufficient to gelatinize said starch, at temperatures sufficiently high and for periods of time sufficiently long to produce starch phosphates wherein the ratio of organically bound phosphorus to inorganic phosphorus is at least 3, the inorganic P is less than 1% and the content of total phosphorus is between 1.7% and 3.8%, the total phosphorus being derived solely from the aforesaid alkali metal phosphate salt material.

9. A process for the production of cold-water-dispersible starch phosphates with viscosities of from 20,000 to 50,000 centipoises which comprises homogeneously incorporating in an ungelatinized corn starch an alkali metal phosphate salt material of pH of 6.5 the concentration of the solution being in the range of about 0.8 and about 1.5 gram mols of said phosphate salt material per kilogram of said solution in proportions ranging between 0.10 gram mol and 0.23 gram mol of said phosphate salt material per 160 grams of anhydrous starch and heating said starch-salt composition, in the absence of moisture sufficient to gelatinize said starch, at temperatures sufficiently high and for periods of time sufficiently long to produce starch phosphates wherein the ratio of organically bound phosphorus to inorganic phosphorus is at least 3, the inorganic P is less than 1% and the content of total phosphorus is between 1.7% and 3.8%, the total phosphorus being derived solely from the aforesaid alkali metal phosphate salt material.

10. A process for the production of cold-water-dispersible starch phosphates with viscosities of from 20,000 to 50,000 centipoises which comprises homogeneously mixing with an ungelatinized starch an aqueous solution of a sodium phosphate salt material of ph of 6.5, the quantity of salt solution being in excess of the amount absorbed by the starch and the concentration of the salt solution being such that, after separation of the excess of salt solution, the moist starch-salt composition contains between 0.10 gram mol and 0.23 gram mol of said phosphate salt material per 160 grams of anhydrous starch, separating the starch-salt composition from excess salt solution, drying the separated starch-salt composition to a moisture content below 15% under conditions that permit the starch to remain ungelatinized, and heating the dried composition in the range of about 15 minutes at about 180 degrees and about 6 hours at between about 150 degrees to about 160 degrees to produce starch phosphates wherein the ratio of organically bound phosphorus to inorganic phosphorus is at least 3, the inorganic P is less than 1% and the content of total phosphorus is between 1.7% and 3.8%, the total phosphorus being derived solely from the aforesaid sodium phosphate salt material.

11. A process for the production of a cold-water-soluble starch phosphate, with a viscosity of from 20,000 to 50,000 centipoises, which comprises mixing 848 parts of corn starch, containing about 10% moisture, with a solution prepared by diluting 114 parts of 85% orthophosphoric acid, neutralizing with 63 parts of 97% sodium hydroxide dissolved in 250 parts of water and finally diluting with 250 parts of additional water, stirring said mixture for about 30 minutes at 30 degrees C., air drying for several hours, breaking up the air-dried salt-starch composition, drying further for about one hour at 110 degrees, then raising the temperature to 180 degrees in a period of about 30 minutes, maintaining at 180 degrees for about 15 minutes and cooling to room temperature.

12. A process for the production of a cold-water-soluble starch phosphate with a viscosity of from 40,000 to 50,000 centipoises, which comprises slurrying 90 parts of corn starch with a solution prepared by dissolving 19.5 parts of monosodium phosphate dihydrate and 40 parts of disodium phosphate heptahydrate in 160 parts of water, stirring said slurry for 10 minutes at 30 degrees, filtering to obtain a filter cake, breaking up said filter cake and drying it at about 60 degrees for about 12 hours, heating the dried filter cake material in an open vessel with simultaneous vigorous agitation to about 130 degrees, maintaining the material at about 130 degrees for about 1 hour, raising the temperature to about 160 degrees, heating at 160 degrees to 170 degrees for about 4 hours and cooling to room temperature.

References Cited

UNITED STATES PATENTS 3,060,170  10/1962  Sietsema et al. _____ 260—233.5

DONALD E. CZAJA, *Primary Examiner.*

LEON J. BERCOVITZ, GEORGE F. LESMES,
*Examiners.*

R. W. MULCAHY, *Assistant Examiner.*